US012071007B2

(12) United States Patent
Gully

(10) Patent No.: US 12,071,007 B2
(45) Date of Patent: Aug. 27, 2024

(54) SYSTEMS AND METHODS FOR CONTROLLING DRIVING DYNAMICS IN A VEHICLE

(71) Applicant: Akrus Inc., Anacortes, WA (US)

(72) Inventor: Benjamin Houston Gully, Anacortes, WA (US)

(73) Assignee: Akrus Inc., Anacortes, WA (US)

( * ) Notice: Subject to any disclaimer, the term of this patent is extended or adjusted under 35 U.S.C. 154(b) by 0 days.

(21) Appl. No.: 17/669,729

(22) Filed: Feb. 11, 2022

(65) Prior Publication Data

US 2023/0029148 A1 Jan. 26, 2023

Related U.S. Application Data

(63) Continuation of application No. 16/380,494, filed on Apr. 10, 2019, now Pat. No. 11,247,561.

(51) Int. Cl.
*B60K 23/08* (2006.01)
*B60K 17/356* (2006.01)
(Continued)

(52) U.S. Cl.
CPC ........ *B60K 23/0808* (2013.01); *B60K 17/356* (2013.01); *B60R 16/0231* (2013.01); *B60T 7/12* (2013.01); *B60W 50/10* (2013.01); *B60K 2023/0883* (2013.01); *B60W 2520/10* (2013.01); *B60W 2520/105* (2013.01); *B60W 2520/12* (2013.01); *B60W 2520/125* (2013.01);
(Continued)

(58) Field of Classification Search
CPC .............. B60K 23/0808; B60K 17/356; B60K 2023/0883; B60R 16/0231; B60T 7/12; B60W 50/10; B60W 2720/30
See application file for complete search history.

(56) References Cited

U.S. PATENT DOCUMENTS 3,212,789 A 10/1965 Stotz
4,749,210 A 6/1988 Sugasawa
(Continued)

FOREIGN PATENT DOCUMENTS

AU 2004100084 A 9/2004
CN 102481930 A 5/2012
(Continued)

OTHER PUBLICATIONS

International Search Report and Written Opinion for PCT/US2020/027377, mailed Jun. 24, 2020, 10 pages.
(Continued)

*Primary Examiner* — Kenneth J Malkowski
(74) *Attorney, Agent, or Firm* — Seed IP Law Group LLP

(57) ABSTRACT

A system for controlling movement of a vehicle includes a user input device and computing system. The user input device dynamically controls a settings or balance of driving dynamics in a vehicle, and the user input device is configured to receive a manual input from a user. The computing system controls the settings of the vehicle driving dynamics and/or balance of the vehicle, the computing system is in data communication with the user input device and configured to change the driving dynamics balance proportionately to the manual input upon receiving an input command based on the manual input from the user input device.

7 Claims, 11 Drawing Sheets

(51) Int. Cl.
   *B60R 16/023*   (2006.01)
   *B60T 7/12*     (2006.01)
   *B60W 50/10*    (2012.01)

(52) U.S. Cl.
   CPC ... *B60W 2520/406* (2013.01); *B60W 2540/00* (2013.01); *B60W 2540/10* (2013.01); *B60W 2540/12* (2013.01); *B60W 2540/18* (2013.01); *B60W 2720/30* (2013.01)

(56) References Cited

U.S. PATENT DOCUMENTS

| | | | |
|---|---|---|---|
| 5,144,558 | A | 9/1992 | Fukushima et al. |
| 6,000,703 | A | 12/1999 | Schubert et al. |
| 6,409,287 | B1 | 6/2002 | Leach et al. |
| 6,549,840 | B1 | 4/2003 | Mikami et al. |
| 7,440,834 | B2 | 10/2008 | Yamaguchi et al. |
| 2002/0175467 | A1 | 11/2002 | Dicus |
| 2003/0200016 | A1 | 10/2003 | Spillane et al. |
| 2005/0236896 | A1* | 10/2005 | Offerle .......... B62D 9/002 303/146 |
| 2009/0012685 | A1 | 1/2009 | Maeda et al. |
| 2010/0049408 | A1 | 2/2010 | Abadie et al. |
| 2013/0190131 | A1 | 7/2013 | Versteyhe et al. |
| 2014/0145498 | A1 | 5/2014 | Yamakado et al. |
| 2014/0379235 | A1* | 12/2014 | Bazaz .......... B60W 30/18181 701/70 |
| 2015/0061243 | A1 | 3/2015 | Sohrabi |
| 2015/0105978 | A1* | 4/2015 | Nakatsu .......... B60W 10/08 701/37 |
| 2015/0246612 | A1 | 9/2015 | Velde et al. |
| 2015/0336473 | A1 | 11/2015 | Spelta et al. |
| 2016/0243940 | A1 | 8/2016 | Kawasaki et al. |
| 2016/0347311 | A1 | 12/2016 | Kurata |
| 2017/0043774 | A1 | 2/2017 | Kelly et al. |
| 2017/0088200 | A1 | 3/2017 | Heil et al. |
| 2018/0201255 | A1 | 7/2018 | Lian et al. |
| 2018/0370541 | A1 | 12/2018 | Cooke et al. |

FOREIGN PATENT DOCUMENTS

| | | |
|---|---|---|
| CN | 106314426 A | 1/2017 |
| CN | 108430847 A | 8/2018 |
| DE | 10 2012 008 383 A1 | 10/2013 |
| EP | 1 759 915 A2 | 3/2007 |
| JP | 61-115734 A | 6/1986 |
| JP | 63-34270 A | 2/1988 |
| JP | 06-297983 A | 10/1994 |
| JP | 2001-58564 A | 3/2001 |
| JP | 2001-336630 A | 12/2001 |
| JP | 3348773 B2 | 9/2002 |
| JP | 2003-237420 A | 8/2003 |
| JP | 2003-267088 A | 9/2003 |
| JP | 2004-114764 A | 4/2004 |
| JP | 2004-308587 A | 11/2004 |
| JP | 2008-114831 A | 5/2008 |
| JP | 2008-168839 A | 7/2008 |
| JP | 2013-192446 A | 9/2013 |
| JP | 2015-80323 A | 4/2015 |
| JP | 2018-1818 A | 1/2018 |
| WO | 2014/122562 A1 | 8/2014 |
| WO | 2017/008700 A1 | 1/2017 |

OTHER PUBLICATIONS

Du et al., "Drive Torque Distribution Control of Wheeled Electric Vehicle," *Tractor & Farm Transporter* 43(2):27-30, Apr. 2016. (English Abstract Only).

Meng et al., "Algorithm on delaminated control of stability and optimized distribution of wheel force for 4WD/WS electric vehicle," *Journal of Mechanical & Electrical Engineering* 35(3):317-322, Mar. 2018. (English Abstract Only).

* cited by examiner

SYSTEMS AND METHODS FOR CONTROLLING DRIVING DYNAMICS IN A VEHICLE

CROSS REFERENCE TO RELATED APPLICATIONS

This application is a continuation of Ser. No. 16/380,494, filed Apr. 10, 2019, the entirety of which is incorporated herein by reference.

BACKGROUND

Background and Relevant Art

Conventional automobiles have a drivetrain, a suspension, and controls that allow a user to operate the drivetrain. The controls typically include a steering control that changes the direction of travel of the vehicle, a throttle control that changes the amount of power output by one or more motors or engines, and a brake control that applies a retarding force to the movement of the vehicle. The manner and balance with which the power is provided to move the vehicle, the retarding force is provided to slow the vehicle, and the steering input is provided to change the direction of travel of the vehicle is typically static for the drivetrain. In some systems, the drivetrain may have two or more drive preset modes selectable by a user that alter the driving dynamics of the vehicle. For example, a sport drive mode increases throttle response relative to a snow/ice drive mode, or a drift drive mode alters a set proportion of engine power delivered to the rear wheels relative to the front wheels in an all-wheel-drive vehicle. Precise control of a vehicle for engaging in high-performance driving is limited by the static or uncontrolled distribution of force and/or traction by the drivetrain. Direct control by the user over one or more driving dynamics of the vehicle in real time may provide improvements in performance and/or enjoyment of driving.

A. BRIEF SUMMARY

In some embodiments, a system for controlling movement of a vehicle includes a user input device and computing system. The user input device dynamically controls a driving dynamic characteristic in a vehicle, and the user input device is configured to receive a manual input from a user. The computing system controls the driving dynamics characteristic of the vehicle, the computing system is in data communication with the user input device and is configured to change the driving dynamics characteristic proportionately to the manual input upon receiving an input command based on the manual input from the user input device.

In other embodiments, a method of controlling movement of a vehicle includes receiving a manual input from a user operating the vehicle with a user input device, transmitting an input command from the user input device to a computing system based on the manual input from the user, and altering a driving dynamics balance of the vehicle from a first driving dynamics balance to a driving dynamics balance using the computing system based on the input command.

In yet other embodiments, a system of controlling movement of a vehicle includes a steering device, a throttle control, a brake control, a user input device, and a computing system. The user input device is continuously variable between a home position and a full input position, and the user input device is configured to provide a manual input based on a location of the user input device between the home position and the full input position. The computing system controls a power output balance between a first portion of the vehicle and a second portion of the vehicle. The computing system is in data communication with the user input device and configured to change the power output balance between the first portion and the second portion proportionately to the manual input upon receiving the manual input from the user input device.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

B. BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is a schematic representation of the vehicle drivetrain of FIG. 1-1 with a power output balance shifted to rear wheels;

FIG. 1-3 is a schematic representation of the vehicle drivetrain of FIG. 1-1 with a power output balance shifted to front wheels;

FIG. 2-1 is a schematic representation of another vehicle drivetrain, according to at least one embodiment of the present disclosure;

FIG. 2-2 is a schematic representation of the vehicle drivetrain of FIG. 2-1 with a power output balance shifted to right wheels;

FIG. 3-1 is a schematic representation of yet another vehicle drivetrain, according to at least one embodiment of the present disclosure;

FIG. 3-2 is a schematic representation of the vehicle drivetrain of FIG. 3-1 with a power output balance shifted to left rear wheel;

FIG. 4-1 is a schematic representation of a further vehicle drivetrain, according to at least one embodiment of the present disclosure;

FIG. 4-2 is a schematic representation of the vehicle drivetrain of FIG. 4-1 with a brake bias shifted to rear wheels;

C. DETAILED DESCRIPTION

Figure 1:
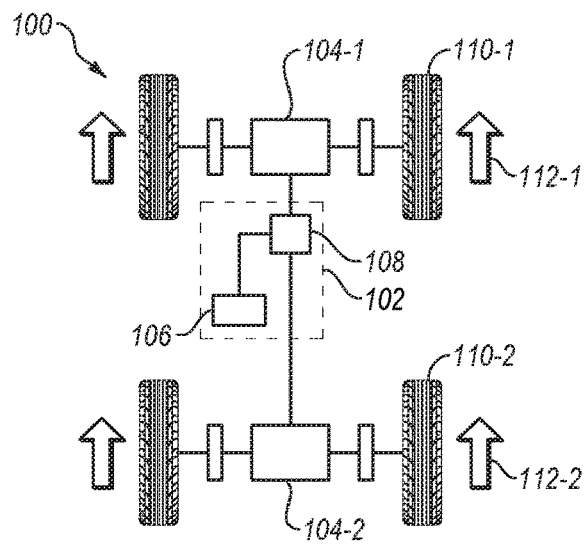
FIG. 1-1 is a schematic representation of a vehicle drivetrain, according to at least one embodiment of the present disclosure.

The present application relates to controlling automobiles. More particularly, the present application relates to providing a new and additional level of control over sophisticated modern drivetrains. Conventional vehicle controls include a steering control, such as a steering wheel; a brake control, such as a brake pedal; and a throttle control, such as an accelerator pedal.

The steering control allows a user to alter the direction of the vehicle's wheels to change the direction of travel of the vehicle. In some conventional systems, a steering input with the steering control changes the direction of the vehicle's wheel proportionately to the angle of the steering input. In other conventional systems, the steering input with the steering control changes the direction of the vehicle's wheel proportionately to the angle of the steering input and the speed of the vehicle. In other conventional systems, the steering control input also changes the direction of the vehicles rear wheels in addition to the front.

A brake control allows the user to apply a force, such as a mechanical force or an electromagnetic force (such as in regenerative braking), to slow or stop the rotation of one or more wheels of the vehicle. In conventional systems, the brake control may provide a brake input to retard the rotation of the wheels based on a fixed ratio between the front wheels and the rear wheels of the vehicle. In other conventional systems, a brake balance ratio may be changed automatically under braking upon loss of grip between the tires and the road surface, such as with an anti-lock braking system.

A throttle control allows the user to control the torque or power output of an internal combustion engine (ICE), an electric motor, or combinations of one or more ICEs and electric motors. In conventional systems, the throttle control provides a throttle input to an ICE to control the amount of air (and fuel) provided to the ICE. In other conventional systems, the throttle control provides an input to request an amount of power or torque (via current, voltage or frequency) to be provided from an electric motor. In some conventional systems, a computer system in the drivetrain receives the throttle input and sends commands to both an ICE and an electric motor to generate a desired amount of total power output from the propulsion system.

In some embodiments according to the present disclosure, a vehicle control system includes a driving dynamics control system that allows the user to alter at least one driving dynamic of the vehicle by a user-selected amount based on a dynamic user input while driving. The input device can be one or more devices acting independently or in conjunction with each other. The input device(s) may have a continuous range of positions between a home position and a full input position. The amount of user input depends on or is proportional to the position of the input device at any location between the home position and the full input position. For example, various driving dynamics controllable within the scope of the present disclosure include the total amount of power output of the propulsion system and/or relative amount of power provided at different wheels, the total amount of braking power and/or relative amount of braking power provided at different wheels, the settings of a powertrain and chassis control system (such as traction control, torque vectoring, stability control or yaw control), the speed of a given wheel or wheels relative to the speed of other wheel or wheels, the total amount of stiffness and/or damping of the suspension and/or the relative amount of stiffness and/or damping of the suspension at different wheels, or the suspension height or weight balance at different corners or wheels of the car. In addition, the operating mode or effect of the user input may be able to be programmed or customized to allow for different effects or different effects under different times or circumstances.

Figures 1, 2:
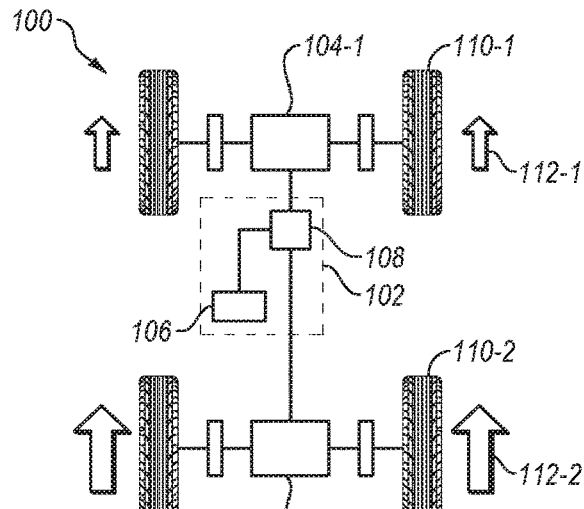
Figures 1, 2, 3:
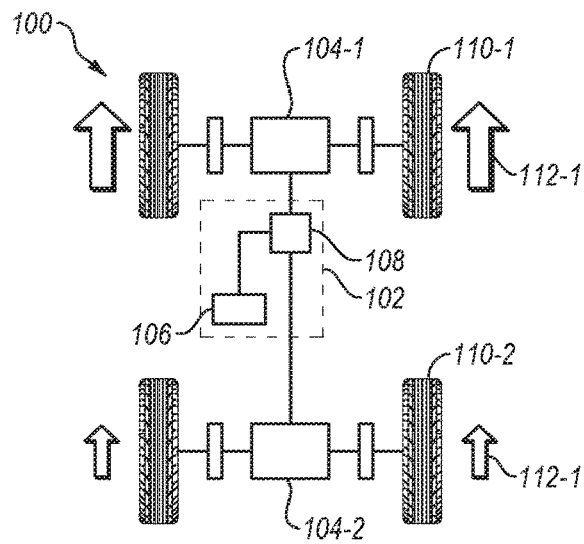
Figure 2:
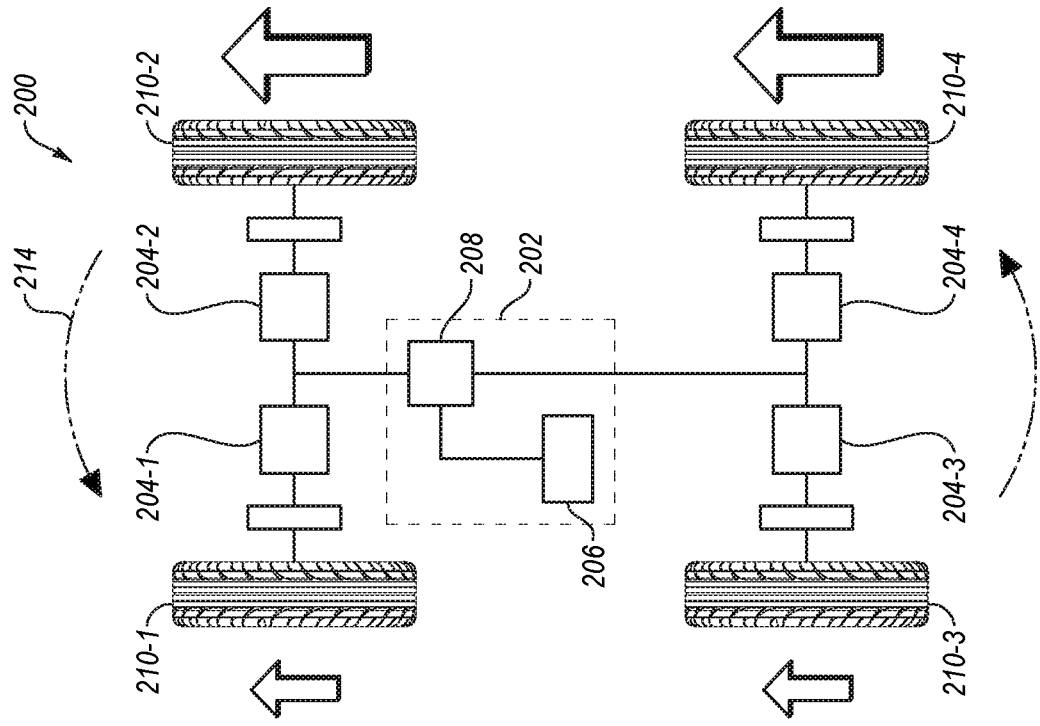
Figures 1, 2:
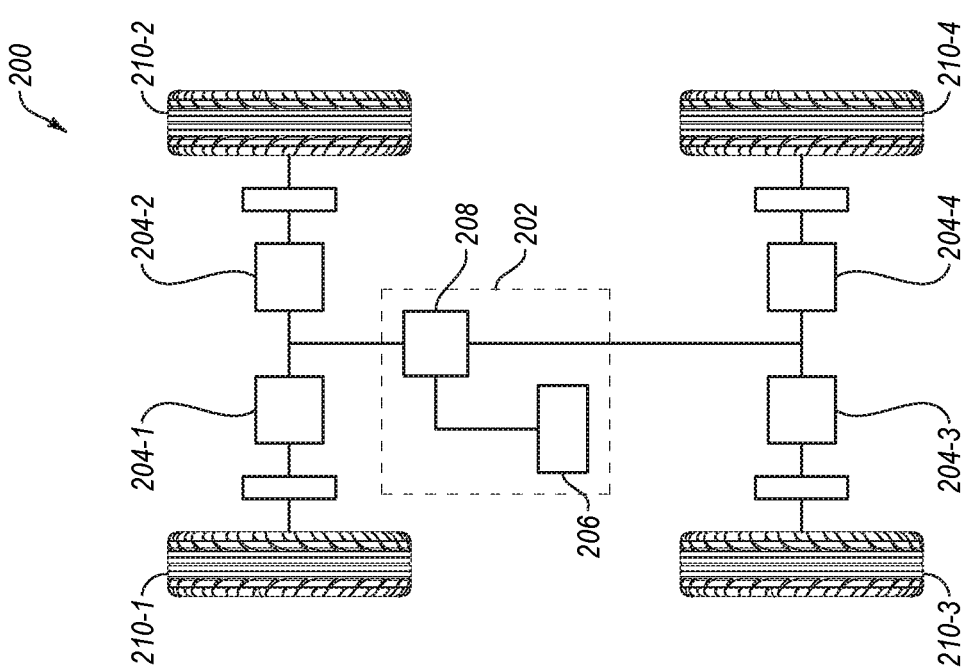
Figures 2, 3:
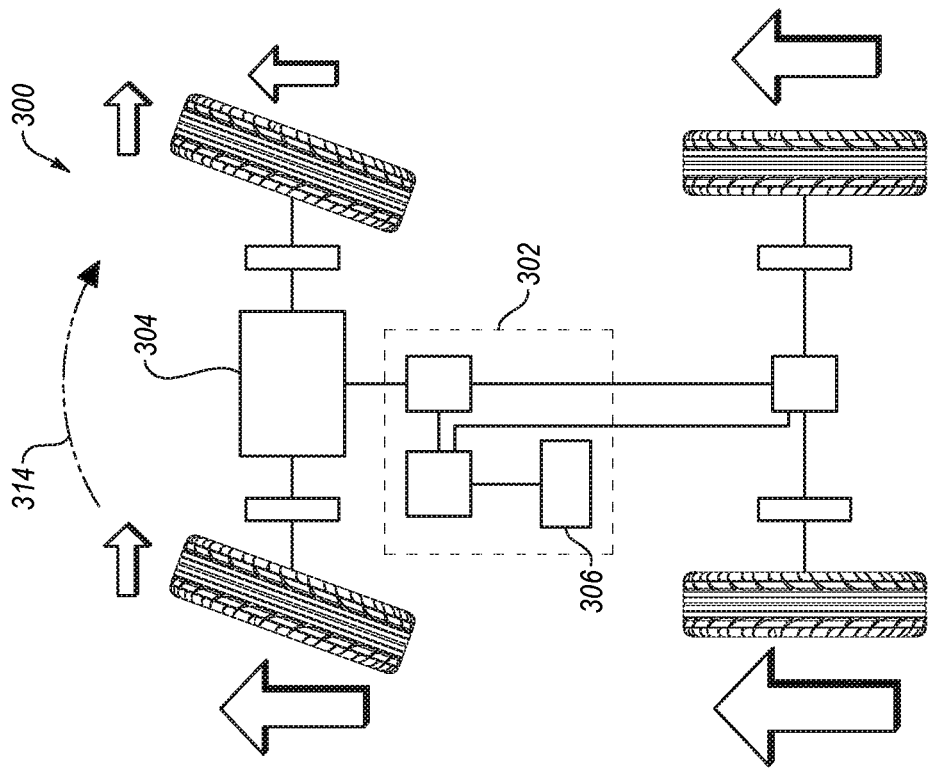
Figures 1, 3:
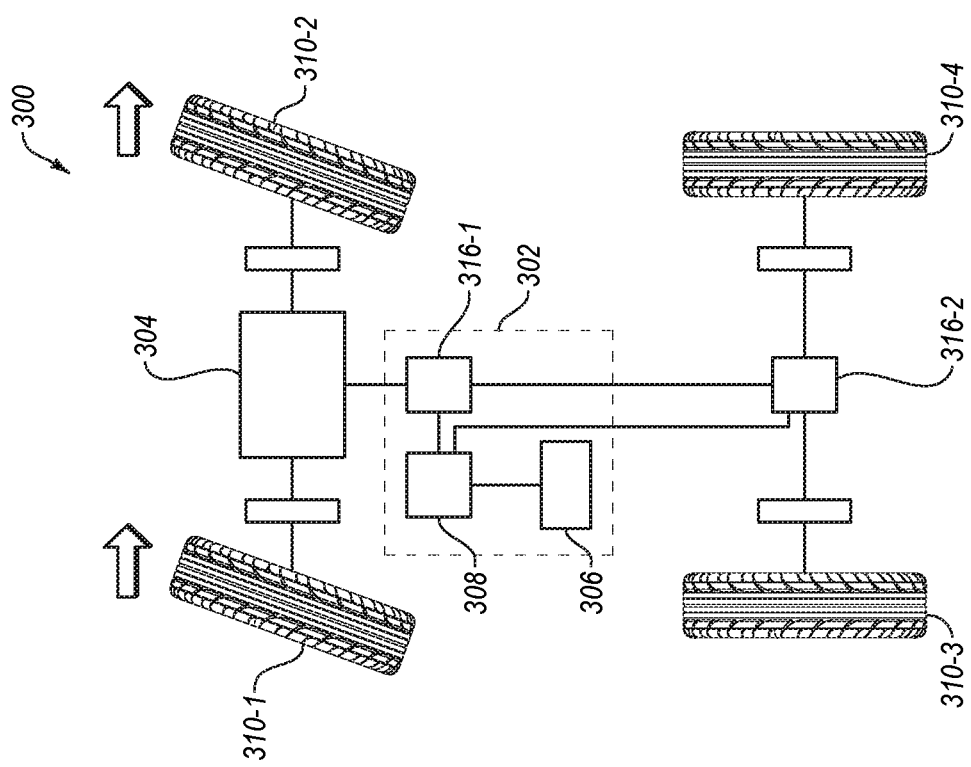

FIG. 1-1 through 3-2 illustrate schematic representations of embodiments of different vehicle drivetrains controlled by a driving dynamics control system. The driving dynamics control system may alter the performance of the drivetrain through a variety of electrical or mechanical implementations.

FIG. 1-1 through 1-3 illustrate a vehicle 100 with a driving dynamics control system 102 in communication with a front power source 104-1 and a rear power source 104-2. The driving dynamics control system 102 includes a user input device 106 in communication with at least one computing device 108. The computing device(s) 108 of the driving dynamics control system 102 communicates with the front power source 104-1 and the rear power source 104-2 to control a power output balance between the front wheels 110-1 and the rear wheels 110-2 of the vehicle 100.

In some embodiments, a power source described in the present disclosure is an ICE, while in other embodiments a power source is an electric motor. For example, the front power source 104-1 illustrated in FIG. 1 may be an ICE, and the rear power source 104-2 may be an electric motor, such as in a hybrid vehicle. In other examples, both the front power source 104-1 and the rear power source 104-2 may be electric motors, such as in high performance electric vehicles. In yet other examples, both the front power source 104-1 and the rear power source 104-2 may be ICEs. While less common, such drivetrains are utilized in high performance vehicles, as well as heavy machinery and larger trucks. Yet other drivetrain layouts will be described herein.

A power output balance is the relative amount of power or torque provided to different wheels of a vehicle. In some embodiments, the power output balance is the relative amount of power output to the front wheels 110-1 and the rear wheels 110-2. In other embodiments, the power output balance includes differences in power delivered to the left wheels and right wheels or to individual wheels, as will be described herein. FIG. 1-1 illustrates a front power output 112-1 at the front wheels 110-1 and a rear power output 112-2 at the rear wheels 110-2 that are approximately equal. In the illustrated embodiment, the front power output 112-1 is provided by the front power source 104-1 and the rear power output 112-2 is provided by the rear power source 104-2. A power output balance that is equal between a front power output 112-1 at the front wheels 110-1 and a rear power output 112-2 at the rear wheels 110-2 may provide for efficient acceleration and reliable handling under most conditions by distributing power equally to propel the vehicle 100.

Generally, each wheel of a vehicle has a contact patch with the road surface that allows for friction or grip between that wheel and the road surface. Each wheel, therefore, has a maximum amount of available grip at any time to change the movement of the vehicle. For example, application of force between the wheel and road surface to accelerate, decelerate (under braking), or hold a lateral or centrifugal load (i.e., under cornering) may utilize some or all of the available grip. Under straight line acceleration, front end lift of the vehicle increases the normal force of the rear wheels 110-2 relative to the front wheels 110-1, meaning the rear wheels 110-2 have a greater amount of available grip relative to the front wheels 110-1. Dynamically altering the power output balance of the front power output 112-1 and rear power output 112-2 can allow for greater control of the vehicle while driving and improve performance. In addition, whether front or rear wheels will lose traction first in a given dynamic situation determines a vehicle's inherent understeer or oversteer characteristics. Thus, by giving the driver control over front and rear distribution of torque, they are also able to control or manipulate the oversteer and understeer balance of the car to produce the driving effect desired for a given situation.

FIG. 1-2 illustrates the vehicle 100 of FIG. 1-1 with a rear biased power output balance. A user may provide a user input on the input device 106 of the driving dynamics control system 102. The computing device 108 or other component of the driving dynamics control system 102 sends a command to the front power source 104-1 and to the rear power source 104-2 to change the power output balance of the drivetrain to deliver a greater proportion of the power output to the rear wheels 110-2 than the front wheels 110-1. This may be applicable during cornering to reduce torque and overloading of the front wheels 110-1 which must also perform the steering, or to break traction to the rear wheels 110-2 for better turn-in to extremely tight turns, or even controlled oversteer or "drift." In addition, a vehicle that tends to understeer is often the safest static state. Thus, a vehicle may be designed for this inherent tendency, and then this embodiment could be used to evoke more balanced or oversteer-prone characteristics under controlled and desirable circumstances—offering the best of both worlds.

In some embodiments, the power output balance is changed by increasing the rear power output 112-2 relative to the scenario described in relation to FIG. 1-1. For example, when the input device 106 is in the home position and no user input is provided, the front power source 104-1 and rear power source 104-2 may provide each 300 pound-feet (lb-ft) of torque at the front wheels 110-1 and rear wheels 110-2, respectively, under full throttle input. The power output balance can change in response to a user input by increasing the rear power output 112-2 to, for example, 400 lb-ft while the front power output 112-1 remains 300 lb-ft under full throttle input.

In other embodiments, the power output balance is changed by decreasing the front power output 112-1 relative to the scenario described in relation to FIG. 1-1. For example, the power output balance can change in response to a user input by decreasing the front power output 112-1 to, for example, 200 lb-ft while the rear power output 112-2 remains 300 lb-ft under full throttle input.

In yet other embodiments, the power output balance is changed by increasing the rear power output 112-2 and decreasing the front power output 112-1 relative to the scenario described in relation to FIG. 1-1. For example, the power output balance can change in response to a user input by decreasing the front power output 112-1 to, for example, 200 lb-ft while the rear power output 112-2 increases to 400 lb-ft under full throttle input. This may be particularly applicable in scenarios with electric motors driven by a shared battery with a maximum current, as the battery may continue to output the maximum current and the distribution of the current to the front power source 104-1 and the rear power source 104-2 is altered to change the power output balance. Similarly, in a system with a single power source (e.g., a conventional ICE powered vehicle), one or more mechanical differentials may deliver different proportions to different wheels of the same power output from the power source.

Any of the methods described herein could be implemented in coordination with the throttle. The throttle is nominally the total amount of torque being requested. Thus, in different embodiments, this may either represent the maximum torque provided at any given wheel, or the total amount of torque provided from all of the drive units. Ultimately, the interrelation between throttle and supplemental driver input can be determined based on what is most seamless and logical to the driver or operator.

FIG. 1-3 illustrates an example of the vehicle 100 of FIGS. 1-1 and 1-2 in which the driving dynamics control system 102 shifts the power output balance toward to the front wheels 110-1. A user may provide a user input on the input device 106 of the driving dynamics control system 102. The computing device 108 or other component of the driving dynamics control system 102 sends a command to the front power source 104-1 and to the rear power source 104-2 to change the power output balance of the drivetrain to deliver a greater proportion of the power output to the front wheels 110-1 than the rear wheels 110-2. This may be applicable during acceleration out of an oversteer or loss of control situation, as the front wheels may be able to apply power without unsafely increasing yaw moments and thus pull the vehicle out of the unsafe scenario. Similarly, shifting the power output balance toward the front wheels 110-1 may be applicable during cornering, as a loss of traction at the front wheels 110-1 initiates understeer, which is more easily controlled and generally safer than oversteer.

FIG. 2-1 illustrates an embodiment of a vehicle 200 having individual power sources 204-1, 204-2, 204-3, 204-4 for each wheel 210-1, 210-2, 210-3, 210-4. In some embodiments, the first power source 204-1 and second power source 204-2 are controlled and/or operated in tandem to function similarly to a front power source (such as the front power source 104-1 described in relation to FIG. 1-1 through FIG. 1-3). In some embodiments, the third power source 204-3 and fourth power source 204-4 may be controlled and/or operated in tandem to function similarly to a rear power source (such as the rear power source 104-2 described in relation to FIG. 1-1 through FIG. 1-3). In other embodiments, the left and right power sources of each pair (e.g., front pair and rear pair) of power sources are controlled and/or operated independently of one another to provide vectoring to the vehicle 200.

For example, the driving dynamics control system 202 may communicate with the individual power sources 204-1, 204-2, 204-3, 204-4 to alter a power output balance of the vehicle between the individual power sources 204-1, 204-2, 204-3, 204-4 based upon a user input from the user input device 206. In some embodiments, a computing device 208 will take input from the user input 206 as well as other vehicle sensors, driver inputs, algorithms and settings to determine the distribution or torque and power to different power sources or wheels 204-1, 204-2, 204-3, and 204-4. For example, the driving dynamics control system 202 could shift the power output balance to the first power source 204-1 and second power source 204-2 to initiate understeer, as described in relation to FIG. 1-3. In other embodiments, the driving dynamics control system 202 may shift the power output balance to the third power source 204-3 and fourth power source 204-4 to initiate oversteer, as described in relation to FIG. 1-2.

In yet other embodiments, the driving dynamics control system 202 may shift the power output balance to the first power source 204-1 and third power source 204-3 to initiate a right hand rotational vectoring, or the driving dynamics control system 202 may shift the power output balance to the second power source 204-2 and fourth power source 204-4 to initiate a left hand rotational vectoring, as illustrated in relation to FIG. 2-2. The relatively greater power output at the second power output 212-2 and fourth power output 212-4 (relative to the first power output 212-1 and the third power output 212-3) creates a resultant rotational vector 214 on the vehicle 200. Under cornering, the outside wheels will have a greater portion of the vehicle load. Thus, transferring power to these wheels will increase the ability to turn, while decreasing power to the inside wheels will reduce tendencies to resist turning (understeer). In addition, the front or rear wheels may be carrying more or less of the cornering load. Thus, for instance, it may be possible to better accelerate by transmitting more power to either the front or rear wheels. Thus, the effect of the driver input may often be a combination of these various forms of implementation. Additionally, these different modes may all be available or used under different circumstances depending on the driving situation, powertrain mode selection, or effects as determined by settings determined dynamically from driver inputs as described herein.

FIG. 3-1 and FIG. 3-2 illustrate an embodiment of a vehicle 300 having a driving dynamics control system 302 in communication with a single power source 304 to control the power output balance to the wheels to improve handling. The vehicle includes a power source 304 that provides power to the wheels 310-1, 310-2, 310-3, 310-4, through a plurality of differentials 316-1, 316-2. The driving dynamics control system 302 may be in communication with the differentials 316-1, 316-2. User input from the input device 306 to the driving dynamics control system 302 causes the computing device 308 to alter the transmission of power from the power source 304 through, for example, a center differential 316-1 to change the power output balance between the front wheels 310-1, 310-2 and the rear wheels 310-3, 310-4. In other examples, user input from the input device 306 to the driving dynamics control system 302 causes the computing device 308 to alter the transmission of power from the power source 304 through, for example, a rear differential 316-2 to change the power output balance between the rear wheels (i.e., the third wheel 310-3 and the fourth wheel 310-4).

During turning, the front wheels 310-1, 310-2 direct the traction force 318 laterally to change the direction of travel of the vehicle 300. The front wheels 310-1, 310-2, therefore, may have less available grip for acceleration. FIG. 3-2 illustrates the power output balance of the vehicle 300 biased through a user input via the input device 306. The user may shift the power output balance of the power source 304 towards both the rear wheels 310-3, 310-4 (as the rear wheels have greater available grip during cornering and inducing oversteer would aid in rotation) and toward the left wheels 310-1, 310-3 to generate a rotation 314 of the vehicle 300 to assist in the cornering.

For example, FIG. 3-2 illustrates a third power output 312-3 at the third wheel 310-3 (rear left) that is greater than the other wheels. Conversely, the second power output 312-2 at the second wheel 310-2 (front right, opposite the third wheel 310-3) is less than the other wheels. The first power output 312-1 and fourth power output 312-4 are between the third power output 312-3 and the second power output 312-2. By altering the power output balance, the user may thereby apply the greatest acceleration and cornering possible by the vehicle 300 without exceeding the limit of grip available at any wheel.

As shown in FIG. 3-2, the distribution of torque or power to different wheels may be determined from input from the driver using the mechanism(s) indicated in this invention, in conjunction with other powertrain control algorithms, including but not limited to traction control, dynamic stability control, or yaw control. In these cases, the driver input(s) would be more specifically tied to a characteristic, such as level of traction or slip, or total vehicle oversteer balance, rather than a specific quantity of torque distribution. In this case, full driver input of a given mechanism would demand full oversteer, or zero traction control; while zero input would enable full traction control or stability control; thus allowing the driver to manipulate the extent of these effects dynamically.

In such embodiments, the distribution of torque shown in FIG. 3-2 may be the result as determined by the torque vectoring, dynamic stability or yaw control system itself, based on inputs such as speed, throttle position, normal forces, roll, pitch, yaw. In such an embodiment the driver input could be used as an input to the control system to request a modification of this balance to elicit a variation in the dynamic behavior. For instance, if the driver has not braked enough for a given corner, they may use the input to control the powertrain in such a manner so as to increase the turn in of the vehicle rather than overrun it.

While the embodiments described in relation to FIG. 1-1 through FIG. 3-2 describe altering the power output balance by redistributing the delivery or generation of power at different wheels, the power output balance may also be changed by actively braking one or more wheels to resist the delivery of power to a wheel and lower the power output at the wheel, or to control the relative amount of negative power applied at one wheel or set of wheels relative to another. For example, FIG. 4-1 and FIG. 4-2 illustrate an embodiment of a vehicle 400 with brakes 420-1, 420-2, 420-3, 420-4 at each wheel 410-1, 410-2, 410-3, 410-4, respectively.

In some embodiments, the driving dynamics control system 402 and brakes 420-1, 420-2, 420-3, 420-4 may alter the power output balance at the wheels 410-1, 410-2, 410-3, 410-4 by resisting the rotation of the wheels 410-1, 410-2, 410-3, 410-4 in different amounts. For example, during cornering, the front wheels (i.e., the first wheel 410-1 and second wheel 410-2) apply a lateral force 418 to change the direction of travel of the vehicle 400, which limits the available grip of the front wheels for acceleration. The brakes 420-1, 420-2, 420-3, 420-4 may apply different amounts of braking force to replicate the power output balance at the wheels 410-1, 410-2, 410-3, 410-4 described in relation to FIG. 3-2.

Figures 2, 4:
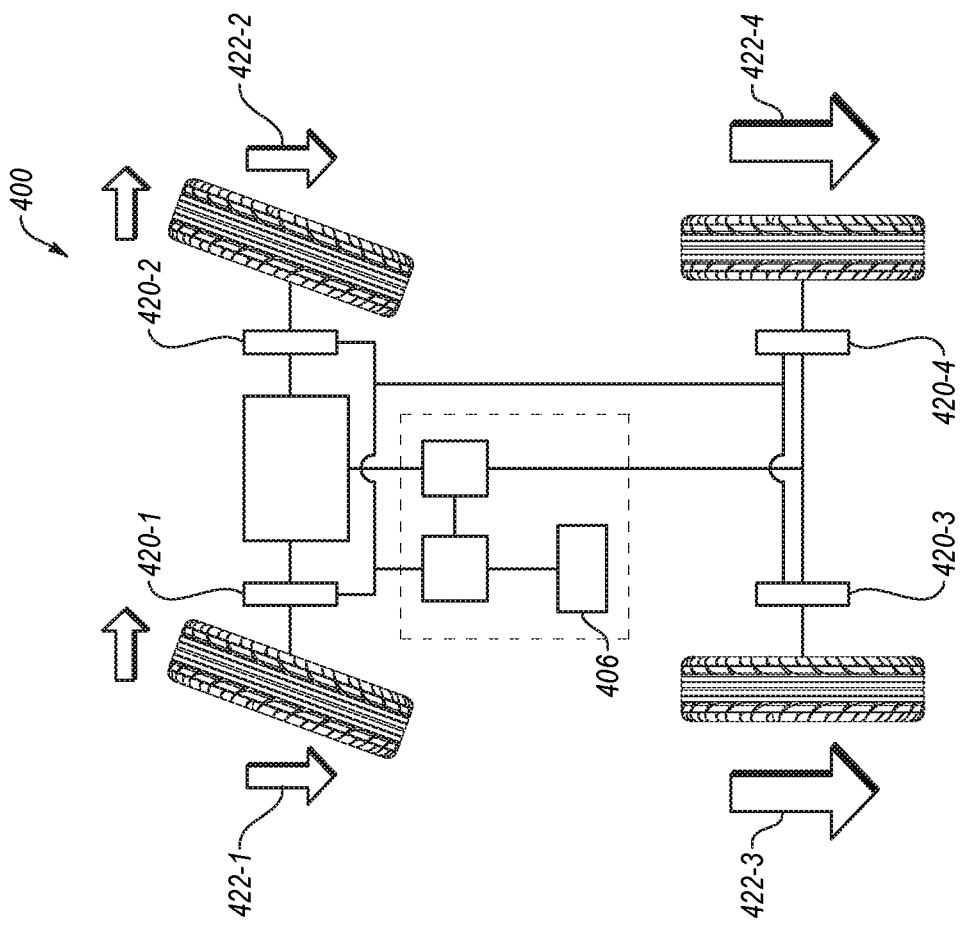
Figures 1, 4:
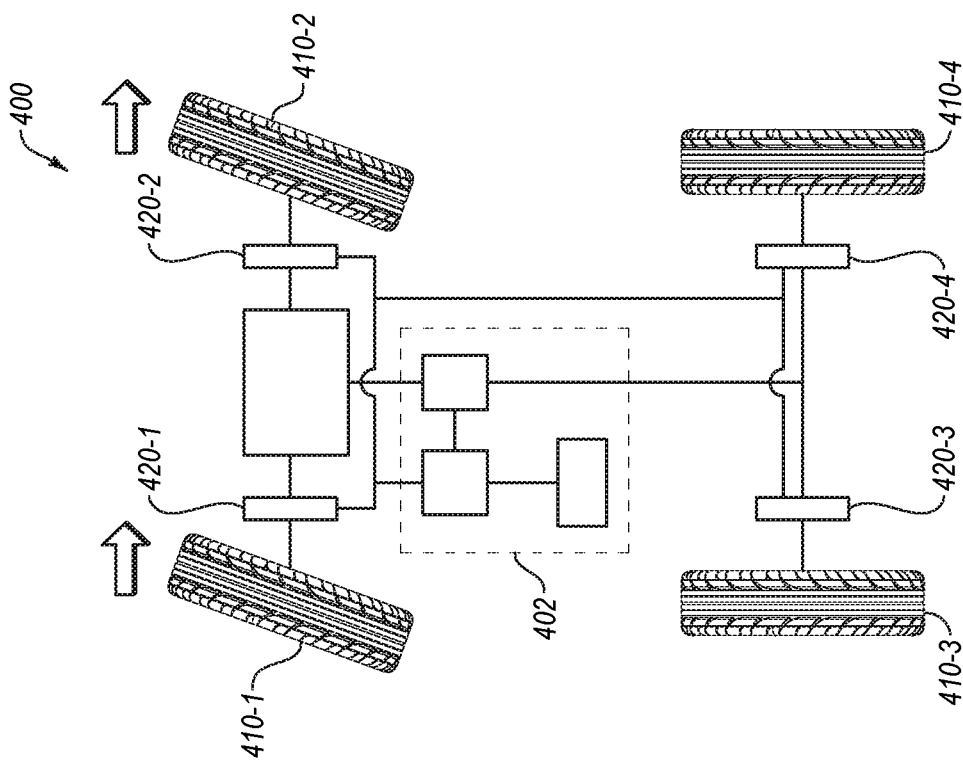

In other embodiments, such as illustrated in FIG. 4-2, the brakes 420-1, 420-2, 420-3, 420-4 may apply different amounts of braking forces 422-1, 422-2, 422-3, 422-4 under deceleration while cornering to trail brake and allow maximum braking forces without exceeding the limit of grip of any given wheel (also known as "threshold braking"). By providing a user input via the input device 406, a user may, through the driving dynamics control system, alter a brake bias of the brakes 420-1, 420-2, 420-3, 420-4 and, thereby, allow for higher performance trail braking than otherwise would be possible with conventional braking systems. Furthermore, in extreme cornering conditions, the total brake force on the rear wheels 422-3 and 422-4 may be further increased to as to break traction of the rear wheels and increase turn in and oversteer, similar to a conventional use of a handbrake.

While FIG. 4-2 illustrates equal braking forces between the front braking forces 422-1, 422-2 and between the rear braking forces 422-3, 422-4, in other embodiments, the left and right braking forces may be different to produce a rotational force on the vehicle 400.

In addition to torque or power, the driver input could also control relative speed differences between wheels. For example, the functions and attributes described herein could be implemented by controlling the speed of one wheel or set of wheels relative to another. For instance, instructing a higher speed value of a certain subset of wheels may induce the same turning vectors or oversteer/understeer balances. In other embodiments, the speed-based driver input could be used to give the user control over the degree of synchronization of wheel speeds—mimicking the 'lockup' characteristics of a traditional mechanical differential, producing a fully controllable limited slip differential. Such that in some embodiments, full input request could demand that both rear wheels spin with the exact same speed (i.e., behave like a locked differential), while zero input request allow them to spin with complete independency based on load and torque input (i.e., behave like an open differential). These control approaches could also be used in conjunction with other aspects defined in this invention such as torque vectoring, traction control, etc.

While some embodiments described herein are described in relation to high performance and/or high-speed applications, it should be understood that the driving dynamics control systems described herein may be applicable in vehicles and applications where traction or grip is important beyond those involving high speeds. For example, driving dynamics control systems described herein may be used in applications traversing difficult terrain, such as overland driving; worksite driving; driving in mud, snow, or rocks; fording bodies of water, or other low-speed applications where driver control of the distribution of power, braking, suspension damping, or other driving dynamics may be beneficial.

For example, when driving up a steep incline (e.g., greater than 20°, greater than 30°, or more), it may be beneficial for the driver to bias more power output to the rear wheels, as more of the vehicle's mass is over the rear wheels. In other examples, when driving through mud or other low-traction driving surfaces, it may be beneficial to provide user control over left and right bias and/or forward and rearward bias of the power output balance such that the driver may "find grip" on one or more wheels as the driving surface conditions change.

Figure 5:
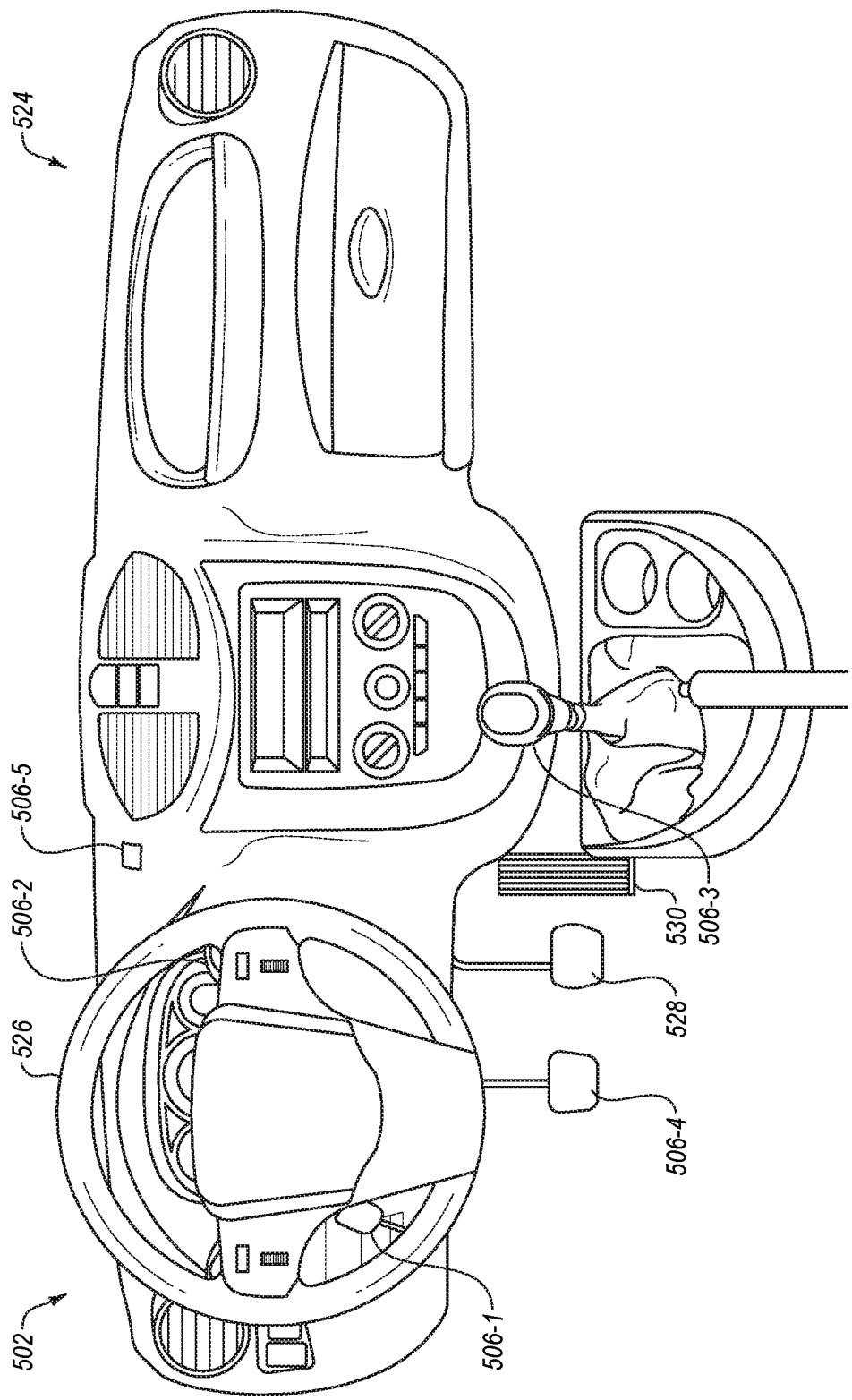
FIG. 5 is a front view of a vehicle cockpit including driving dynamics control system input devices, according to at least one embodiment of the present disclosure.

FIG. 5 illustrates an example cockpit 524 of a vehicle. The cockpit 524 includes a plurality of controls, such as a steering wheel 526, a brake control 528, a throttle control 530, and other conventional vehicle controls. The cockpit 524 may further include one or more user input devices 506-1, 506-2, 506-3, 506-4, 506-5 for a driving dynamics control system 502.

In some embodiments, the user input device(s) include hand-operated input device(s). For example, the user input device may be steering wheel-mounted, such as thumb operated buttons, scrolling wheels, switches, levers 506-2, thumbsticks, or other thumb operated devices or paddles 506-1 positioned on the rear of the steering wheel that the user may pull toward the steering wheel using the index finger or other fingers. In other examples, the input device 506-3 may be console- or dash-mounted, such as a rotary dial, lever, or other user input device that protrudes from the console or dash or a slider that allows variable input by moving the user input device in the plane of the surface of the console or dash.

In other embodiments, the user input device(s) include foot-operated controls. For example, the user input device may be positioned in the footwell of the vehicle, such as a pedal 506-4. In some examples, the pedal 506-4 may be positioned in the location of a conventional clutch pedal as a third pedal (in addition to the brake control 528 and the throttle control 530). In other examples, the pedal 506-4 may be positioned to the left of a conventional clutch pedal as a fourth pedal. In at least one example, the pedal 506-4 may allow the user to modulate the user input to the driving dynamics control system 502 while steering more easily than a steering wheel-mounted control.

In yet other embodiments, the user input device(s) includes sensors 506-5 configured to monitor the position or movement of the user and interpret the position or movement of the user as user inputs to adjust one or more driving dynamics of the vehicle. For example, the sensor 506-5 may be an optical sensor that tracks the head movement of the user. Upon leaning of the head, the sensor 506-5 may measure the angle of lean of the user's head and the driving dynamics control system 502 converts the angle of lean to a user input. The angle of lean of the user's head, thereby, instructs the driving dynamics control system 502 to alter one or more driving dynamics. Such control may be relatively transparent to a user, as the user may lean his or her head in anticipation of cornering. A more aggressive cornering maneuver may cause a user to lean his or her head at a greater angle. The driving dynamics control system 502 can interpret the angle of lean of the user's head to alter the brake bias, the power output balance, or other driving dynamics to induce trail braking, understeer, oversteer, or other driving behavior. In a particular example, a flick of the user's head immediately before a steering input can shift the power output balance toward the rear wheels, inducing a drift, while returning the user's head to an upright position can restore an equal power output balance, allowing the user to hold a four-wheel drift through the turn.

In other examples, a sensor 506-5 can be integrated into the user's seat and allow the user to control the user input to the driving dynamics control system 502 by shifting the user's body weight on the seat. For example, the user can lean his or her body in anticipation of cornering. A more aggressive cornering maneuver may cause a user to lean his or her body weight to a greater degree. The driving dynamics control system 502 can interpret the shift of the user's body weight to alter the brake bias, the power output balance, or other driving dynamics to induce trail braking, understeer, oversteer, or other driving behavior. In a particular example, a sudden shift of the user's body weight immediately before a steering input can shift the power output balance toward the rear wheels, inducing a drift, while the lateral forces of the turn will return the user's body weight to a more balanced position and restore an equal power output balance, allowing the user to hold a four-wheel drift through the turn.

In at least one embodiment, the input from any of the given physical inputs 506-1, 506-2, 506-3, 506-4, 506-5 or others may be used to change the settings or effect of input received from other input devices such as 506-1, 506-2, 506-3, 506-4, or 506-5. For example, changing a button on the steering wheel 506-1 or position of lever 506-3 may then change the mode or effect or interpretation of depressing pedal 506-4. Such that, in one embodiment, lever 506-3 being in the rearward position may indicate that the pedal 506-4 would affect front to rearward power bias, while lever 506-3 in a left or right position, would then set the system such that depression of pedal 506-4 would instead left or right torque or power balance, respectively.

In at least one embodiment, the sensor 506-5 and/or driving dynamics control system 502 may be in data communication with one or more vehicle sensors. The vehicle sensors may monitor one or more characteristics of the vehicle movement, such as yaw, roll, pitch, steering angle, brake, or throttle input. The vehicle sensors, therefore, can provide context for the inputs from the user sensors 506-5. For example, the vehicle sensor may be a steering or yaw sensor that can indicate the vehicle's intended trajectory. Thus, the driving dynamics control system 502 would know how to interpret and implement input from the driving dynamics system driver input—for example to shift power balance to left or right based on the chassis cornering scenario at hand.

A user sensor 506-5 can measure the body weight of the user on the seat, while the vehicle sensor may be a lateral g-force sensor that measures lateral acceleration of the vehicle. The lateral g-force sensor may provide the driving dynamics control system 502 with information regarding the lateral movement of the vehicle, such that the can disable the seat sensor 506-5 and/or adjust the input from the seat sensor 506-5 during cornering.

Figure 6:
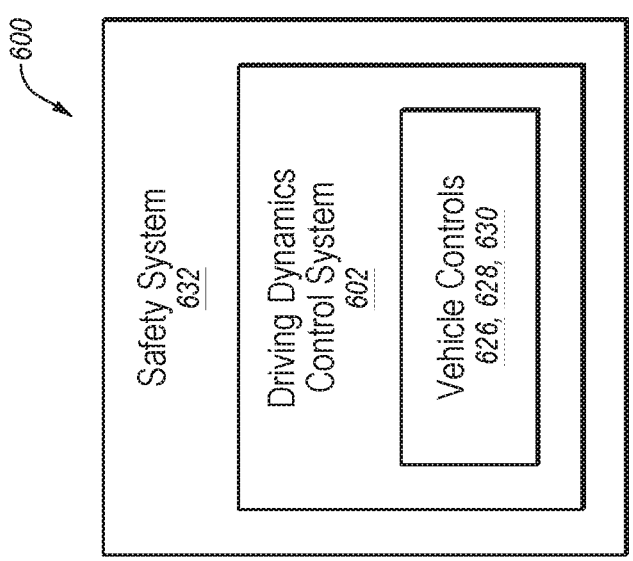
FIG. 6 is a schematic representation of the nested control systems of a vehicle, according to at least one embodiment of the present disclosure.

FIG. 6 illustrates a system diagram of the control mechanisms of another embodiment of a vehicle 600. The performance and/or behavior of the vehicle 600 may be controlled by a nested set of systems that determine the behavior of the wheels and/or the vehicle as a whole. In some embodiments, the vehicle controls, including the steering control 626, the brake control 628, and the throttle control 630, provide instructions to the vehicle 600 to change the angle of the wheels, the braking force, or the power output of the power source, respectively.

One or more of the vehicle controls may provide instructions that are subsequently modified by the driving dynamics control system 602. For example, the throttle control 630 may provide an instruction to the power source(s) to provide 50% of the available power to the wheels. The driving dynamics control system 602 may then determine how the requested available power is delivered to the wheels. In at least one example, the power source(s) may be capable of providing 200 lb-ft of torque. The throttle control 630 provides instructions to produce 100 lb-ft from the power source(s). The driving dynamics control system 602 then directs 10 lb-ft to the front wheels and 90 lb-ft to the rear wheels based upon a user input to the driving dynamics control system 602.

The vehicle controls 626, 628, 630 and the driving dynamics control system 602 may operate within an envelope of one or more safety systems 632 of the vehicle 600. A vehicle 600 may have traction control, anti-lock braking, yaw control, stability control, or other safety systems. In such safety systems 632, the traction control and/or anti-lock braking may intervene when a loss of traction is detected at any wheel. In the previous example, the throttle control 630 and driving dynamics control system 602 combine to direct 90 lb-ft of available torque to the rear wheels. In the event that the rear wheels slip, the traction control system may then reduce the torque to the rear wheels.

In some embodiments, the traction control system reduces the torque to only the rear wheels, for example, the reducing the torque to 75 lb-ft at the rear wheels, while maintaining the 10 lb-ft at the front wheels. In other embodiment, the traction control system reduces the total power output of the power source(s), reducing the produced 100 lb-ft to 80 lb-ft. The driving dynamics control system 602 still provides the same power output balance by directing 8 lb-ft to the front wheels and 72 lb-ft to the rear wheels (i.e., a 90/10 rear-bias). In other embodiments or operating modes, the safety system may limit the total effect that the driver input can request. For instance, in a regular public driving condition mode, the driver may request 100% torque to rear wheels, but the safety system may limit this to 80%. Thus, the driver input can be forced to operate within limits as set by different modes of safety system or driving dynamics control system. In certain operating modes, the driving dynamics control system 602 may be used to modulate aspects of these safety systems. For example, in some embodiments, the input may modulate the extent or envelope of yaw, traction or stability control which the safety control system allows; allowing the driver to modulate from fully mitigated to full functional.

Figure 7:
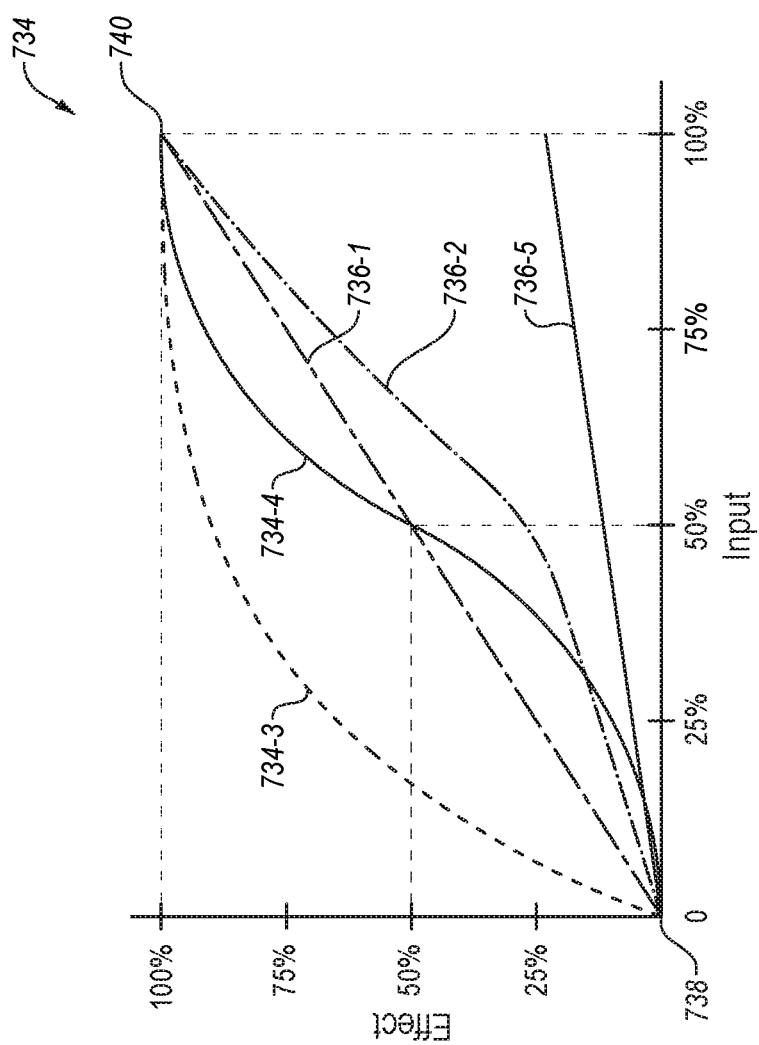
FIG. 7 is a chart illustrating a plurality of relationship curves between inputs and effects of a driving dynamics control system, according to at least one embodiment of the present disclosure.

FIG. 7 is a chart 734 illustrating examples of user inputs to an input device and the associated command that is provided to the driving dynamics control system. The chart 734 includes different relationship curves that depict different conversion rates between the user input device positioned at the home position 738 and the full input position 740. At the home position 738, the input device is providing 0% and the driving dynamics control system is having 0% effect on the vehicle. At the full input position 740, the user input device is moved to the greatest extent from the home position 738 and the driving dynamics control system provides, in some embodiments, 100% of the possible effect on the selected driving dynamic.

In some embodiments, a 100% effect alters the power output balance to provide all available torque to the front wheels. In other embodiments, a 100% effect alters the power output balance to provide all available torque to the rear wheels. In yet other embodiments, a 100% effect alters the braking balance to provide all available braking power to the front wheels. In further embodiments, a 100% effect alters the braking balance to provide all available braking power to the rear wheels. In yet further embodiments, a 100% effect alters the power output balance to direct as much power to one or more wheels as the drivetrain allows (in examples where a differential may only be capable of sending some, but not all, power to certain wheels). In still further embodiments, a 100% effect alters another aspect of the vehicle and/or drivetrain to the greatest degree the vehicle and/or drivetrain is capable.

The various relationship curves of the chart 734 illustrate example relationships that may provide a user different types of control over the driving dynamic. For example, a first relationship curve 736-1 depicts a linear relationship with a 1:1 ratio between the user input to the effect of the input command that is provided by the driving dynamics control system. A linear relationship provides a continuous relationship in which a 50% movement of the input device from the home position to the full input position produces a 50% effect on the driving dynamic, while a 100% movement of the input device from the home position to the full input position produces a 100% effect on the driving dynamic, and the relationship is continuous therebetween (e.g., a 63% input yields a 63% effect).

In another example, a second relationship curve 736-2 depicts a linear, but non-continuous relationship. For example, between 0% and 50% input, the second relationship curve 736-2 has a 2:1 relationship, producing a 25% effect at 50% input. Between 50% and 100% input, the second relationship curve 736-2 has a 1:3 relationship providing a linear relationship from 50% input and 25% effect to a final 100% input (i.e., a full input position) yielding a 100% effect on the driving dynamic.

In yet another example, a third relationship curve 736-3 depicts a non-linear relationship. The third relationship curve 736-3 has a more aggressive relationship (i.e., producing greater effect for each percentage of input) until approximately 33% input, after which the third relationship curve 736-3 has a slope less than 1.0. Such a relationship between the input and the effect of the driving dynamic control system can allow more rapid activation of the driving dynamic control system during the initial movement of the input device from the home position 738, while allowing more precise control over the effect nearer the full input position 740.

In a further example, a fourth relationship curve 736-4 depicts a non-linear relationship with an inflection point between the home position 738 and the full input position 740 of the input. The fourth relationship curve 736-4 may allow precise control of the effect near the home position 738 and the full input position 740, while providing rapid change in the effect through the center of the input range.

In a yet further example, a fifth relationship curve 736-5 illustrates a linear relationship that produces less than a 1:1 effect for a given input throughout the range of motion of the input device from the home position 738 to the full input position 740. The home position 738 provides no input and no effect on the driving dynamics control system. The full input position 740 (i.e., 100% input) of the fifth relationship curve 736-5 provides a 25% effect. The fifth relationship curve 736-5 and other relationships that do not provide 100% effect may limit the user's ability to modify the driving dynamics from the standard dynamics of the vehicle. This limitation may be beneficial when a user is learning to control the driving dynamics of the vehicle or while the user is learning new driving techniques.

For example, a user that is beginning to learn to control a vehicle during a lateral slide or drift will commonly apply too much power to the rear wheels causing the vehicle to spin out. Limiting the relationship of the input to the effect may allow the driving dynamics control system to change the power output balance less and limit the likelihood of a spinout for a novice driver or even an experienced driver learning to slide a vehicle laterally. In other examples, a user that is learning to trail brake upon entrance to a corner may desire to shift a brake bias toward the rear of the vehicle. Delivering 100% of the brake bias to the rear wheels may limit the effectiveness of threshold braking or lock the rear wheels. Limiting the effect to, for example, 30% brake bias upon 100% input toward the rear wheels can limit the user's ability to unintentionally lock the rear wheels.

In still further examples, different elements and features of the relationship curves described in relation to FIG. 7 can be used in combination. For example, other relationship curves may be linear over a portion of the input range and non-linear over a different portion of the input range. A relationship curve may be continuous over the full input range, or a relationship curve may have one or more discontinuities in the full input range. Any shape relationship curve may provide less than 100% effect at the full input position 740. For example, a full input (i.e., 100% input) may translate to less than 90% effect, less than 80% effect, less than 70% effect, less than 60% effect, less than 50% effect, less than 40% effect, less than 30% effect, less than 20% effect, less than 10% effect, or any values therebetween.

In some embodiments, a driving dynamics control system has more than one potential relationship curve. For example, a driving dynamics control system may have a first relationship curve 736-1 and the third relationship curve 736-3 stored in memory of the driving dynamics control system, and the driving dynamics control system may allow the user to select the desired relationship curve. In other examples, the relationship curve may be programmable or modifiable by the user to allow customization to a vehicle, to the user, or to the environment. In some situations, the fifth relationship curve 736-5 or a similar relationship curve that limits the effect may be beneficial in adverse weather conditions where comparatively little change to the power output balance is needed to alter the traction of the wheels and disrupt the balance of the vehicle.

In some embodiments, the user input may be measured incrementally, such as measuring the location of the input device at 10% increments between the home position and the full input position. For example, the input device may bin the user input into one of ten input values including between 0% and 10%, 10% and 20%, 20% and 30%, etc. In other examples, the input device may bin the user input into 5% increments so that both a 17% input and a 19% input is received by the driving dynamics control system as being between 15% and 20%. In some embodiments, the input device may measure the user input in bins having a size in a range having an upper value, a lower value, or upper and lower values including any of 1%, 2%, 5%, 10%, 15%, 20%, 25%, 33%, 50%, or any values therebetween. For example, the bins may be greater than 1% of the range of motion of the input device. In other examples, the bins may be less than 50% of the range of motion of the input device. In yet other examples, the bins may be less than 20%. In further examples, the bins may be less than 5%. In yet other examples, the bins may be less than 1%. In other embodiments, the user input may be measured continuously, such as measuring the user input at the input device at any position between the home position and the full input position. For example, the input device may have a continuously variable resistor that measures the position of the input device along a continuous curve.

Figure 8:
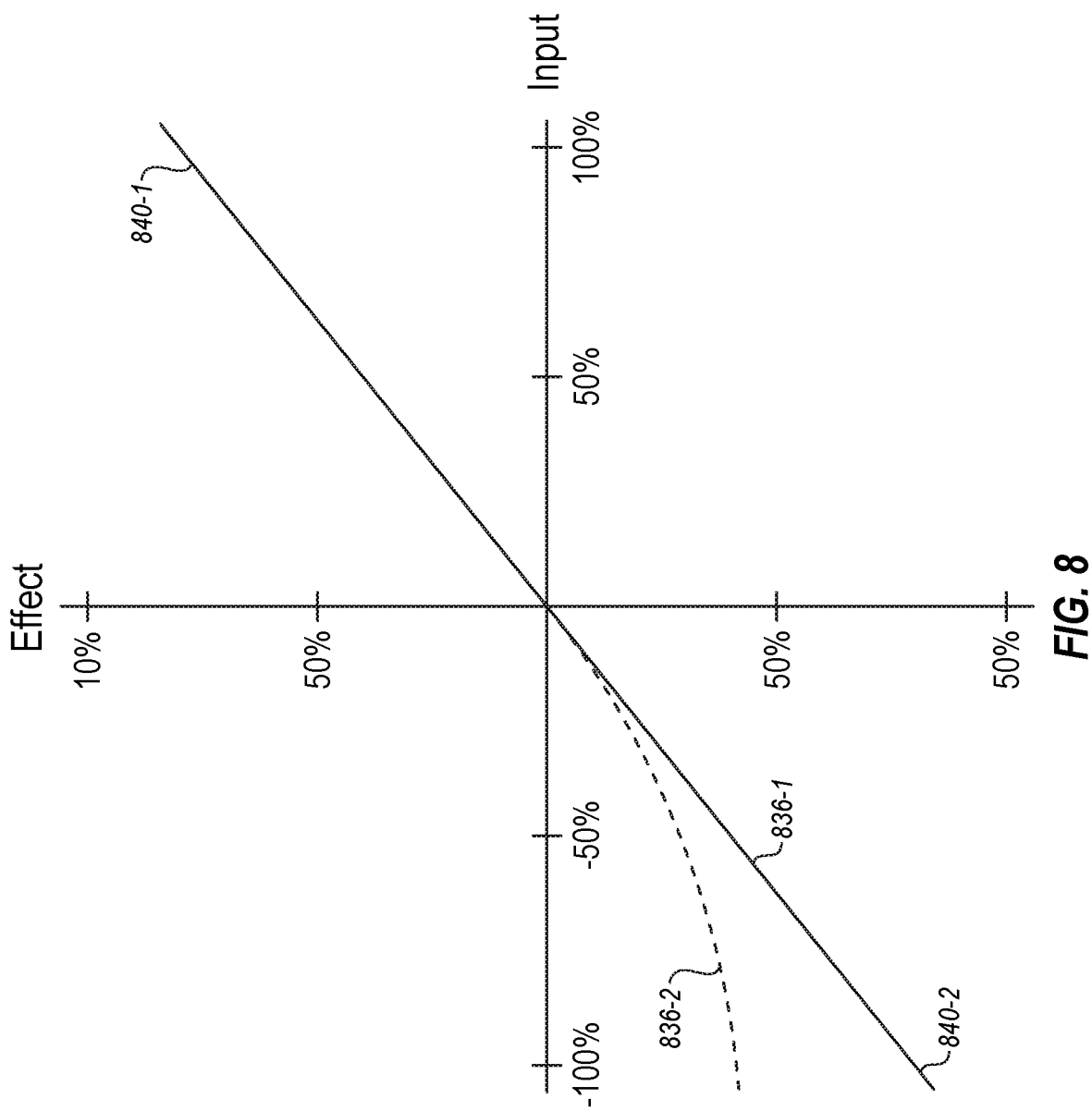
FIG. 8 is a chart illustrating a plurality of relationship curves between positive and negative inputs and effects of a driving dynamics control system, according to at least one embodiment of the present disclosure.

FIG. 8 illustrates another chart 834 illustrating an embodiment of a relationship curve 836 for a driving dynamics control system and input device that allows positive and negative movement from the home position 838. The input device allows movement from the home position 838 in a positive direction (e.g., a forward direction, upward direction, leftward direction) toward a positive full input position 840-1 and from the home position 838 in a negative direction opposite the positive direction (e.g., a rearward direction, downward direction, rightward direction) toward a negative full input position 840-2. Such an input device may allow inputs that shift a power output balance, brake bias, or other driving dynamic of a vehicle in two directions. In at least one example, the home position 838 represents power output balance that is equal between the front wheels and the rear wheels. Moving the input device to the positive full input position 840-1 instructs the driving dynamics control system to direct 100% of the power output balance to the front wheels. Moving the input device to the negative full input position 840-2 instructs the driving dynamics control system to direct 100% of the power output balance to the rear wheels.

In some embodiments, the relationship curve is linear, as illustrated by the first relationship curve 836-1 in FIG. 8. In other embodiments, the relationship curve is non-linear, as described in relation to FIG. 7. In yet other embodiments, the relationship curve is discontinuous, as described in relation to FIG. 7. In further embodiments, the positive side of the relationship curve 836 between the home position 838 and the positive full input position 840-1 may be the inverse of the negative side of the relationship curve 836 between the home position 838 and the negative full input position 840-2. For example, the shape of the first relationship curve 836-1 between the home position 838 and the positive full input position 840-1 and the shape of the relationship curve between the home position 838 and the negative full input position 840-2 are similar in shape but opposite in the effect. In still further embodiments, the positive side of the relationship curve between the home position 838 and the positive full input position 840-1 may be different from the inverse of the negative side of the first relationship curve 836-1 between the home position 838 and the negative full input position 840-2.

For example, the shape of a second relationship curve 836-2 between the home position 838 and the positive full input position 840-1 and the shape of the second relationship curve 836-2 between the home position 838 and the negative full input position 840-2 are dissimilar in shape but opposite in the effect. In at least one example, the positive side of the second relationship curve 836-2 may be linear and continuous with a 1:1 input to effect ratio, while the negative side of the second relationship curve 836-2 may be non-linear and the negative full input position 840-2 may provide only −50% effect. Such a relationship curve may be beneficial to allow the driving dynamics control system to direct 100% of the power output balance to the front wheels at the positive full input position 840-1 and only 75% of the power output balance to the rear wheels at the negative full input position 840-2. This may allow the user as much understeer behavior (exceeding the grip threshold of the front wheels) as the vehicle can create but limit the amount of oversteer (exceeding the grip threshold of the rear wheels) the vehicle and the user may create to limit spins.

In some embodiments, different portions of ranges of the input may produce different effects. For instance, the first 75% of an input range may be used as a request for altering power balance left and right, while the last 25% of travel may be used to also introduce manipulation of front and rear power balance.

Figure 9:
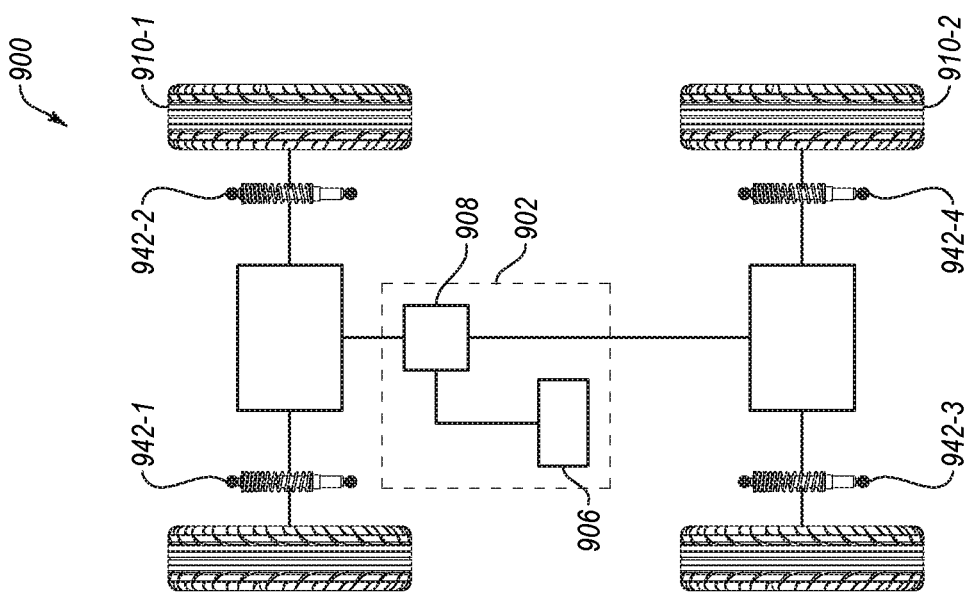
FIG. 9 is a schematic representation of a vehicle suspension system, according to at least one embodiment of the present disclosure.

FIG. 9 illustrates an example of a vehicle 900 with a driving dynamics control system 902 in communication with an active suspension system. A user input device 906 and computing device 908 send user commands to the active suspension system to alter the behavior of one or more suspension components. The suspension system may include springs (e.g., coil, leaf, or air-based) and shock absorbers 942-1, 942-2, 942-3, 942-4 as well as anti-sway or anti-roll bars. In some embodiments, the suspension system includes active shock absorbers 942-1, 942-2, 942-3, 942-4 that can vary in stiffness. For example, the shock absorbers 942-1, 942-2, 942-3, 942-4 may be hydraulic shock absorbers or magnetorheological shock absorbers. Hydraulic shock absorbers may have a stiffness, damping, or rebound properties that are variable by changing valving or routing of the hydraulic fluid within the shock and/or reservoir. Magnetorheological shock absorbers contain a magnetorheological fluid in the shock absorber that changes viscosity relative to an applied magnetic field. This can allow the stiffness, damping, or rebound properties to change quickly in response to inputs from a user to the driving dynamics control system 902.

Magnetorheological shock absorbers and/or hydraulically controlled shock absorbers can allow the performance properties of one or more of the shock absorbers 942-1, 942-2, 942-3, 942-4 to be altered independently of the others. This can allow the front shock absorbers 942-1, 942-2 to be stiffened independently of the rear shock absorbers 942-3, 942-4 to manipulate the relative tractive limits of either set of wheels or as a spectrum between the multiple wheels. In some instances, this may be used to limit or control brake dive or squat. Brake dive can permit more gradual loading of the front suspension, limiting chatter in the front wheels 910-1. Similarly, this can allow the rear shock absorbers 942-3, 942-4 to be stiffened to limit and/or prevent suspension "squatting" during acceleration. In some instances, compression of the rear suspension can assist in acceleration on uneven surfaces and/or from a standing start to improve the grip of the rear wheels 910-2.

In some embodiments, the driving dynamic input may be used to control the damping or stiffness of suspension components at different portions of the vehicle to further affect chassis balance, for example with respect to oversteer or understeer. In such instances, the driver input may be in a configuration to demand power balance shifted toward the rear wheels 910-2 to increase oversteer. The driver input may then also incorporate a call to change the rear suspension settings 942-3 and 942-4 to increase stiffness to further increase oversteer.

In other examples, increasing stiffness, damping, or rebound of the left shock absorbers 942-1, 942-3 or of the right shock absorbers 942-2, 942-4 may hold the vehicle 900 flatter while cornering in a right turn or left turn, respectively. Cornering flat can help distribute contact forces and tractions amongst the wheels 910-1, 910-2 to improve cornering performance on smooth roads. Direct user control of the suspension stiffness, damping, or rebound can allow a user to adjust the suspension based on performance preferences and/or extrinsic conditions.

The system depicted in FIG. 9 may also be used to allow user input 906 to control the relative ride height of different corners of the vehicle 942-1 942-2 942-3 942-4, or other methods which would enable control of the weight distribution of the vehicle, which can also be used to control tractive limits of wheels based on desired driving characteristics or dynamic conditions.

EXAMPLE CASES

Example 1: Approaching a gentle corner, little to no braking may be required, as the user starts to turn the wheel, the user would also gradually begin to provide a user input on the input device to increase the amount of power output balance laterally to the outside rear wheel (i.e., opposite the direction of the turn) and thus increase the degree to which the car "wants to turn". Only a medium to small amount of effect would be required or desired as the turn is shallow, and the less the pedal is depressed nominally increases total grip across all wheels available for acceleration. Thus, the driver would balance the amount of grip that would be beneficial versus the amount of "rotation" or "active yaw"—thereby maximizing the speed the car can carry through the turn while also making the driver feel engaged and in control. This also enables less steering wheel angle, and thus maximizes grip and potentially the total amount of power that can be transmitted to the wheels. Control over this balance may nominally also decrease the amount of braking necessary, as the car's rotation would be accelerated by the pedal, further increasing speed through the corner.

Example 2: Approaching a sharp turn, the user and vehicle approach the corner with the brakes engaged. As the vehicle begins to turn, the user provides a greater input to the driving dynamics control system to alter the power output balance. With a driving dynamics control system configured to alter the power output balance between the front wheels and the rear wheels, the user input instructs the driving dynamics control system to reduce torque to the front wheels. The driving dynamics control system maintains or increases torque at the rear wheels to increase the vehicle's tendency to rotate while increasing the relative available grip on the front wheels for turning. The driver input may also be configured to modulate the effect of the traction control or dynamic stability control systems, to allow for greater (controlled) rotation or oversteer. Under such operation the user then reduces the user input as the vehicle straightens out coming out of the turn to maximize longitudinal grip for acceleration. In other examples, the system can be used to direct more torque to the front wheels while accelerating out of a corner if the user produced too much oversteer during cornering. The additional torque delivery to the front wheels (and/or automatic traction control system) can pull the vehicle out of the corner into a more safe/controlled state.

If the driving dynamics control system effect alters the power output balance laterally to the outer wheels (as opposed to front/rear example), the user may provide a user input to modulate and balance the rotating effect of the lateral torque vectoring versus turning of the steering wheel to maximize total speed and desired dynamics. Additionally, if the user has not braked sufficiently for the corner, the user can utilize the driving dynamics control system to increase the rotation of the car rather than only having the steering wheel to control and correct while in the turn.

Example 3: In another embodiment of this concept multiple driver inputs may be used to enable multiple controlled effects. For instance, as in FIG. 5, steering wheel mounted input devices, such as scroll wheels or paddles 506-1 may be configured to allow driver input with regard to balance of torque distribution to the left or right. At the same time the pedal 506-4 may be used to control the torque balance front to rear. This allows the driver complete control over the various potential desired imbalances of torque vectoring as shown in FIG. 3-2.

Example 4: A lever could be placed at the center console or elsewhere, that could be used as a secondary input to put the system to select different settings or allow for variations of driver input. Such a center console lever or joystick 506-3 could allow the driver to select or determine the specific desired effect from the other modulated driver input, such as from a pedal 506-4. For example, if such a joystick had four different positions they could perform as follows: with lever 506-3 in left position then pedal 506-4 modulates torque to the left wheels, with lever 506-3 in right position pedal 506-4 modulates torque to right wheels, with lever 506-3 in front position the pedal 506-4 modulates torque to the front wheels, or with lever 506-3 in rear position the pedal 506-4 then modulates torque to the rear wheels.

In some embodiments, the user input may go into a torque vectoring or yaw control algorithm rather than having a direct control over the torque balance. For instance, the input could act as a setting in the control algorithm to determine the degree to which the driver is desiring to achieve a certain type of characteristic or powertrain behavior (such as oversteer or understeer), and the actual implementation and/or specific torque vectoring values are then ultimately determined by an algorithm such as torque vectoring, yaw control, dynamic stability control or traction control.

In an additional embodiment, these configurations and effects could be adjusted and customized by the driver. For instance, the driver may be given access to some or all settings and be permitted to reconfigure the system and various inputs to have different effects based on their own desired settings.

Example 5: The driving dynamics control system is configured to alter a brake bias of the vehicle in addition to the power output balance. A computing device of the driving dynamics control system may measure one or more properties of the vehicle and/or the vehicle controls to determine whether a user input to the driving dynamics control system controls the brake bias or the power output balance. For example, vehicle sensors and/or vehicle controls in communication with the computing device may provide information to the computing device to allow the computing device to determine whether the vehicle is accelerating, braking, cornering, or a combination thereof.

Figure 10:
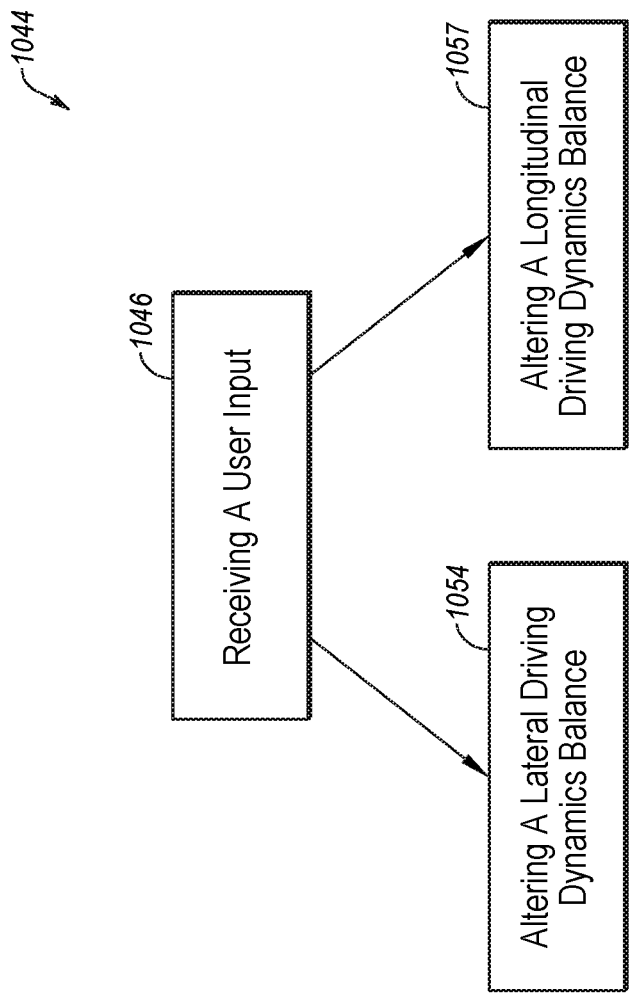
FIG. 10 is a flowchart illustrating a method of controlling the driving dynamics of a vehicle, according to at least one embodiment of the present disclosure.

FIG. 10 illustrates an embodiment of a method 1044 of modifying a driving dynamic of a vehicle. The method 1044 includes receiving a user input at 1046. Based on the user input at 1046, the method 1044 includes modifying a lateral driving dynamics balance at 1054 and/or a longitudinal driving dynamics balance at 1057.

In some embodiments, modifying a lateral driving dynamics balance at 1054 and/or a longitudinal driving dynamics balance at 1057 includes modifying at least one of the suspension, power output balance, brake bias, or other vehicle properties in response to a user input provided in real time according to the relationship curves described in relation to FIG. 7 and FIG. 8.

Figure 11:
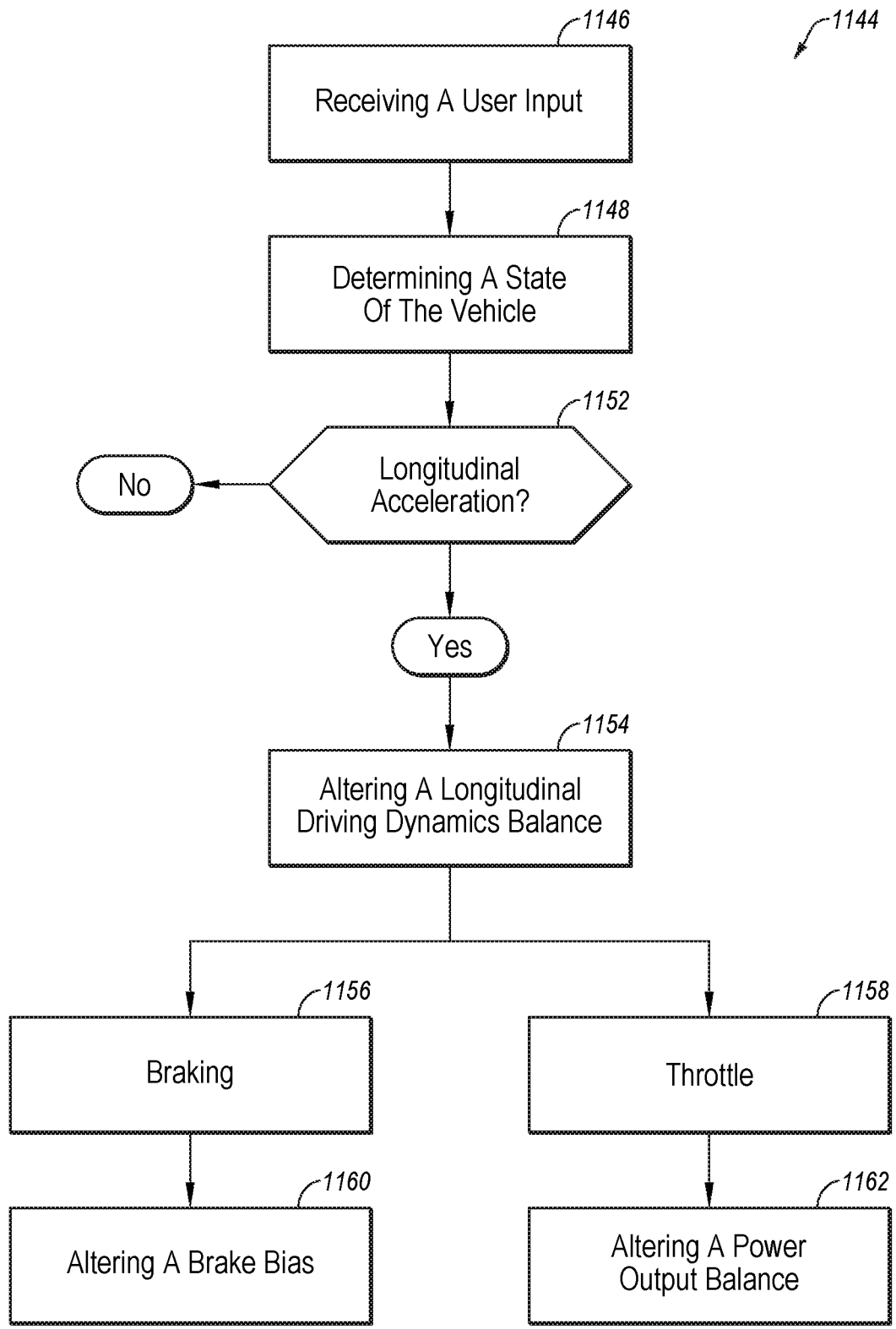
FIG. 11 is another flowchart illustrating a method of controlling the driving dynamics of a vehicle, according to at least one embodiment of the present disclosure.

FIG. 11 illustrates an embodiment of a method 1144 of modifying a driving dynamic of a vehicle. The method includes receiving a user input at 1146 and determining a state of the vehicle at 1148. The state of the vehicle includes determining the longitudinal acceleration of the vehicle (i.e., accelerating under power or braking) at 1152. The longitudinal acceleration state of the vehicle is reflected by either braking (deceleration) of the vehicle at 1156 or throttle input (acceleration) of the vehicle at 1158. The driving dynamics control system may receive information regarding the brake input or the throttle input of the vehicle, or in other embodiments, the driving dynamics control system may receive information from one or more vehicle sensors, such as an accelerometer, that provides information regarding the movement of the vehicle. If the driving dynamics control system determines that the vehicle is in a braking state, the driving dynamics control system can alter the longitudinal balance of the brake bias at 1160 based on the user input. If the driving dynamics control system determines that the vehicle is in a braking state, the driving dynamics control system can alter the longitudinal balance of the power output balance at 1162 based on the user input.

Figure 12:
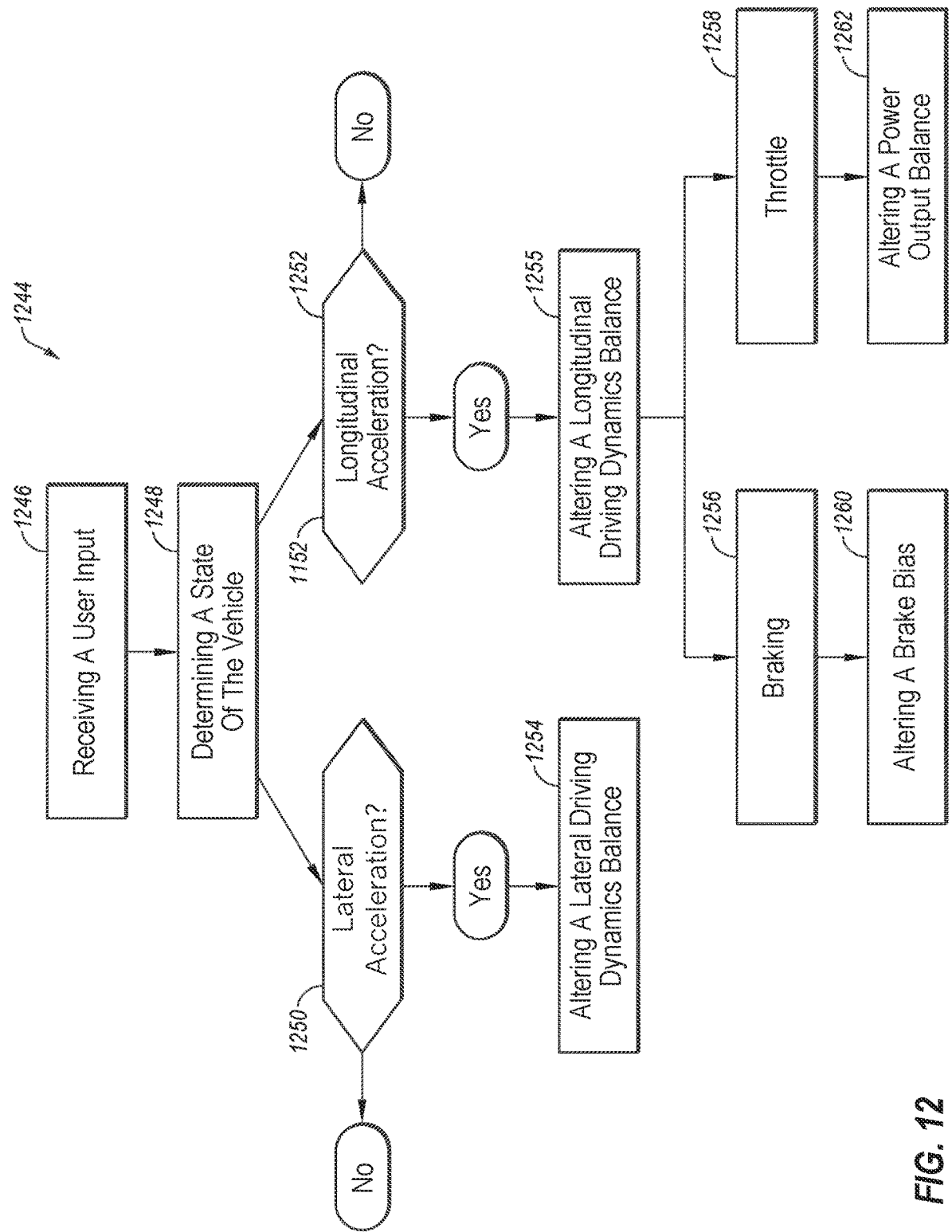
FIG. 12 is yet another flowchart illustrating a method of controlling the driving dynamics of a vehicle, according to at least one embodiment of the present disclosure.

FIG. 12 illustrates another embodiment of a method 1244 of modifying a driving dynamic of a vehicle. The method includes receiving a user input at 1246 and determining a state of the vehicle at 1248. The state of the vehicle may include determining the lateral acceleration of the vehicle (i.e., cornering) at 1250 and the longitudinal acceleration of the vehicle (i.e., accelerating under power or braking) at 1252. If the driving dynamics control system determines that the vehicle is experiencing lateral acceleration, such as by measuring steering input or by measuring lateral acceleration through an accelerometer or other vehicle sensor, the driving dynamics control system can alter a lateral driving dynamics balance based upon the user input at 1254. For example, during cornering, the vehicle sensors may provide information to the driving dynamics control system, and the driving dynamics control system may alter a lateral aspect of the power output balance, brake bias, or suspension behavior.

The method 1244 also includes determining the longitudinal acceleration of the vehicle at 1252. The longitudinal acceleration state of the vehicle is reflected by either braking (deceleration) of the vehicle at 1256 or throttle input (acceleration) of the vehicle at 1258. The driving dynamics control system may receive information regarding the brake input or the throttle input of the vehicle, or in other embodiments, the driving dynamics control system may receive information from one or more vehicle sensors, such as an accelerometer, that provides information regarding the movement of the vehicle. If the driving dynamics control system determines that the vehicle is in a braking state, the driving dynamics control system can alter the longitudinal balance of the brake bias at 1260 based on the user input. If the driving dynamics control system determines that the vehicle is in a braking state, the driving dynamics control system can alter the longitudinal balance of the power output balance at 1262 based on the user input.

For example, if the vehicle is accelerating longitudinally only (e.g., in a straight line), the driving dynamics control system may alter the longitudinal balance of the power output balance based on the user input. If the vehicle is accelerating longitudinally and laterally (e.g., increasing in speed around a corner), the driving dynamics control system may alter the longitudinal balance and lateral balance of the power output balance based on the user input.

Figure 13:
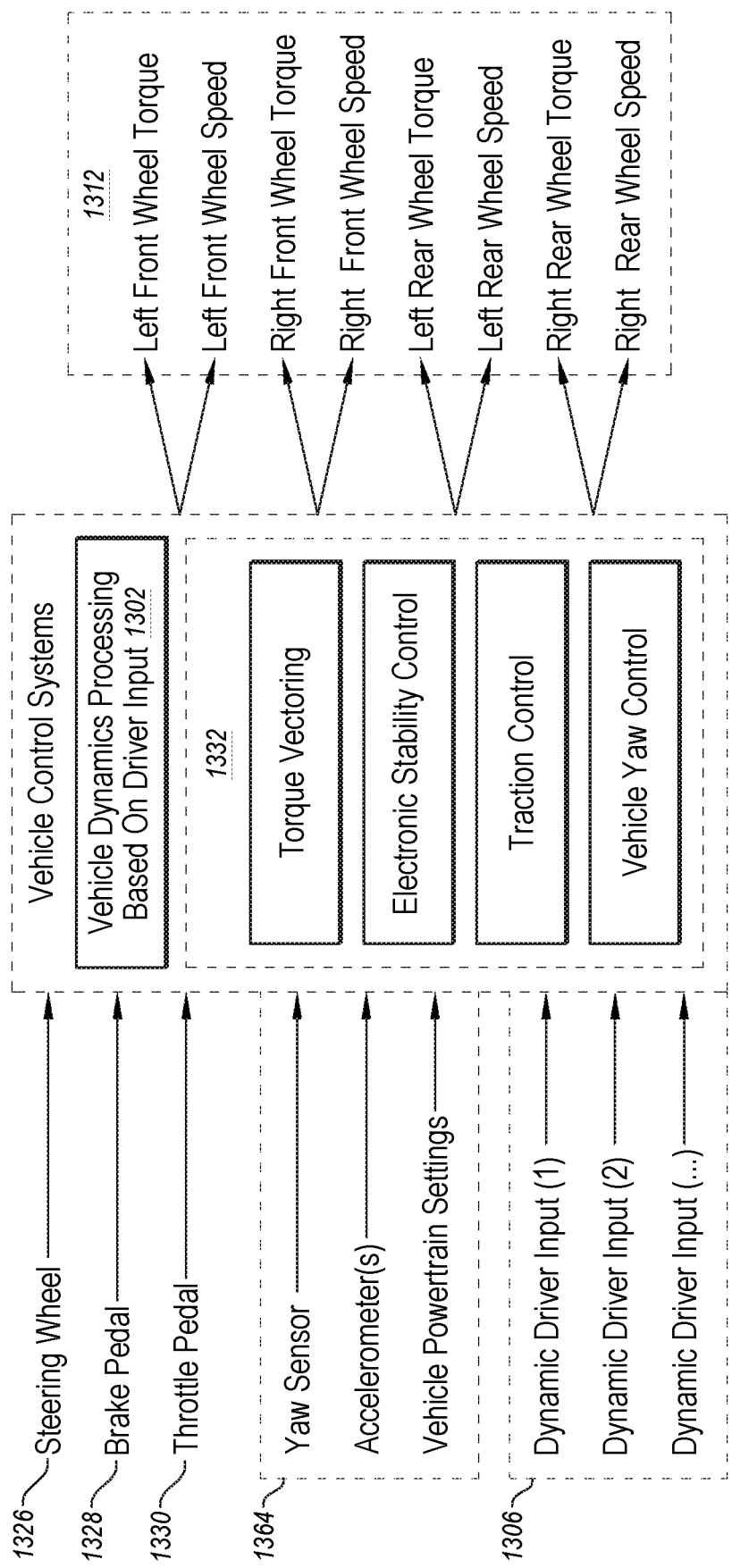
FIG. 13 is a flowchart illustrating a workflow of inputs and outputs from the vehicle control system, according to at least one embodiment of the present disclosure.

FIG. 13 is a flowchart illustrating a workflow of inputs into and outputs from the vehicle control systems. The vehicle control systems can include the driving dynamics control system 1302 and vehicle safety systems 1332, as described herein. The vehicle control systems can work independently or together to receive user inputs from a steering wheel 1326, a brake pedal 1328, a throttle pedal 1330, and one or more user input devices 1306 and vehicle sensor inputs from vehicle sensors 1364 such as a yaw sensor, an accelerometer, and vehicle powertrain settings. The vehicle control systems can work independently or together to alter powertrain outputs 1312 such as the nominal or relative torque or wheel speed at each of the vehicle wheels.

In at least some embodiments, a driving dynamics control system according to the present disclosure can control or modify the behavior of the wheels to provide a user with additional and improved real time control over the performance of the vehicle.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. A vehicle, comprising:
a plurality of wheels;
a steering device coupled to the plurality of wheels and structured to generate a steering input;
a suspension coupled to the plurality of wheels
a prime mover configured to generate a torque output individually to each wheel of the plurality of wheels;
a throttle control configured to generate throttle input instructions to control the torque output of the prime mover;
a brake control configured to provide a braking effect to the computing system for each of the wheels of the plurality of wheels;
a dynamic user input device configured to generate an input command by a user-selected amount, the user input device being independent of the steering device, throttle control, and brake control, and the input command being independent of the steering input, the throttle input, and the braking effect; and
a computing system coupled to the plurality of wheels, the steering device, the suspension system, the prime mover, the throttle control, the brake control, and the user input device, the computing system configured to:
receive the input command from the user input device;
receive instructions from the throttle control;
receive the steering input from the steering device;
receive the braking effect from the brake control; and
alter at one or more wheels of the plurality of wheels at least one of (a) a direction of movement of the vehicle, (b) the torque output, (c) the braking effect, and (d) suspension behavior by the user selected amount in response to receiving the user input command from the user input device.

2. The vehicle of claim 1, wherein the prime mover comprises at least a first motor coupled to a first pair of wheels of the plurality of wheels and a second motor coupled to a second pair of wheels of the plurality of wheels.

3. The vehicle of claim 1, wherein the prime mover comprises a first motor coupled to a first wheel of the plurality of wheels, a second motor coupled to a second wheel of the plurality of wheels, a third motor coupled to a third wheel of the plurality of wheels, and a fourth motor coupled to a fourth wheel of the plurality of wheels.

4. The vehicle of claim 1, wherein the user input device includes a hand-operated control.

5. The vehicle of claim 1, wherein the user input device includes a steering mounted control.

6. The vehicle of claim 1, wherein the user input device comprises a manual input that is continuously variable between a home position and a full input position, and wherein the computing system is configured to change the torque output of the prime mover proportionately to the manual input at the user input device and to change one or more of a steering input of the steering device, a throttle input of the throttle control, or a brake input of the brake control.

7. The vehicle of claim 1 further comprising a sensor system coupled to the computing system and configured to measure movement of the vehicle and, in response to measuring the movement of the vehicle, the computing system configured to alter at least one of the torque output, braking effect, and suspension behavior at one or more wheels of the plurality of wheels on the vehicle.

* * * * *